No. 859,440. PATENTED JULY 9, 1907.
P. EBNER.
WHEEL.
APPLICATION FILED DEC. 10, 1906.
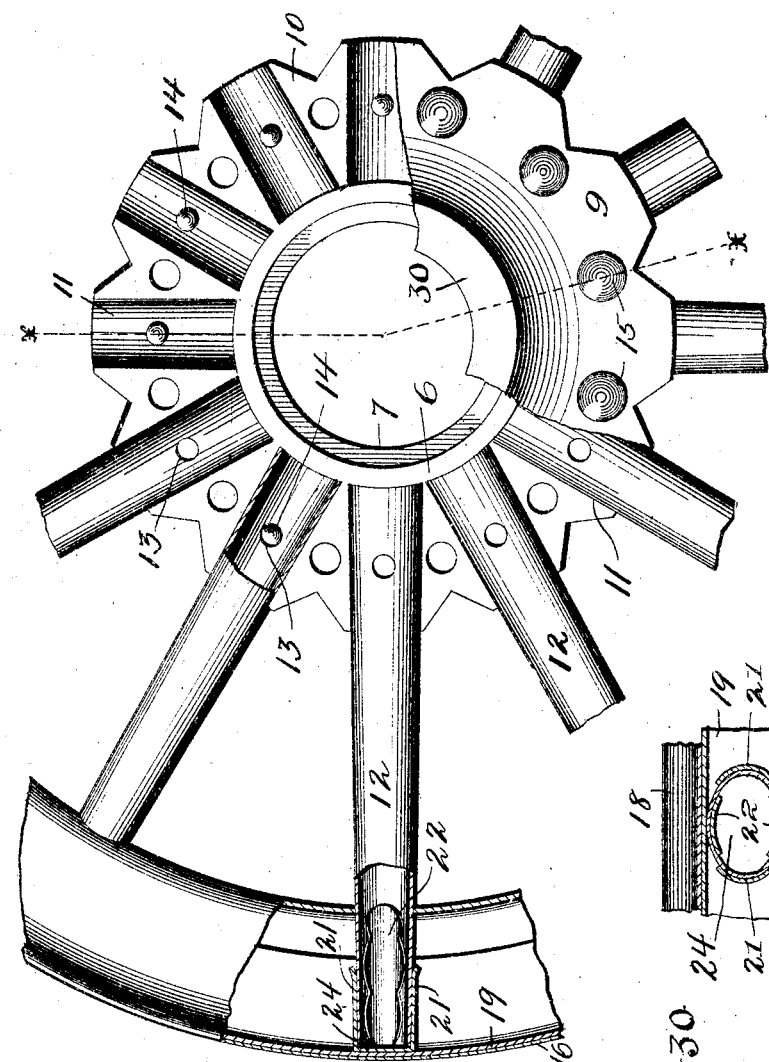
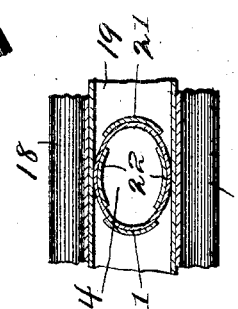
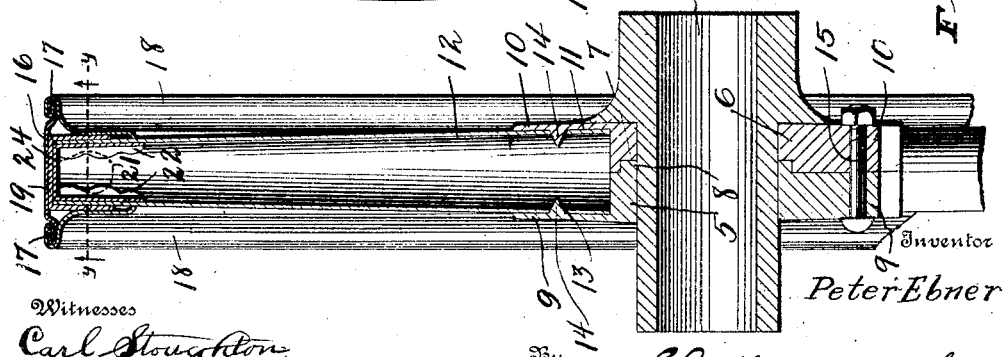
Witnesses
Carl Stoughton
F. G. Campbell
Inventor
Peter Ebner
By Shepherd & Parker
Attorneys

UNITED STATES PATENT OFFICE.

PETER EBNER, OF COLUMBUS, OHIO.

WHEEL.

No. 859,440.　　　Specification of Letters Patent.　　　Patented July 9, 1907.

Application filed December 10, 1906. Serial No. 347,066.

*To all whom it may concern:*

Be it known that I, PETER EBNER, a citizen of the United States, residing at Columbus, in the county of Franklin and State of Ohio, have invented certain new and useful Improvements in Wheels, of which the following is a specification.

My invention relates to wheels and has for its object the provision of an improved method of manufacturing an entirely metallic vehicle wheel which will be strongly built and durable as well as economical to construct.

Further objects and advantages of the invention will be set forth in the detailed description which now follows:

In the accompanying drawing, Figure 1 is a view partly in side elevation and partly in section of a vehicle wheel constructed in accordance with the invention, Fig. 2 is a vertical section through a portion of said wheel, and, Fig. 3 is a horizontal section upon line *y y* of Fig. 2, looking in the direction of the arrows.

Like numerals designate corresponding parts in all of the figures of the drawing.

Referring to the drawing and particularly to Figs. 1 and 2, it will be seen that the hub of my improved vehicle wheel is made in two sections 5 and 6. The portion 6 of the hub is recessed as at 7 for the reception of an annular flange 8 of the portion 5. Flanges 9 and 10 formed integral with the portions 5 and 6 of the hub, are recessed as at 11 for the reception of hollow spokes 12. These hollow spokes 12 are perforated as at 13 for the reception of lugs 14 which project from the walls of the recesses 11. The portions of the hub which lie between the spokes come flush together as is indicated at the lower portion of Fig. 2 and bolts 15 pass through these portions of the hub and serve to tie the two sections of the hub together.

The felly of the wheel indicated at 16 has its outer edges bent into engagement as at 17 with annular flanges 18. Located between these annular flanges is a U-shaped stiffening web 19. The outer ends of the spokes 12 are engaged with clips which are carried by this stiffening web, said clips comprising in the present instance, four depending tongues 21 and 22. The tongues 22 come inside of the spoke, while the tongues 21 lie outside of the outer end of the spoke as is illustrated in dotted lines in Fig. 2 and in full lines in Fig. 3; all of these tongues, however, depend from the base piece 24 which is secured to the stiffening web 19. After the wheel has been assembled as hereinbefore described, the parts are all brazed together both at the hub and at the outer ends of the spokes, the tongues 21 and 22 being brazed to the outer ends of the spokes, and the stiffening web being brazed to the felly both at the periphery and at the sides. The inner ends of the spokes are brazed into the recesses 11, while the two sections of the hub are also brazed together in addition to being held by the bolts 15. The inner portions of the rims 18 meet at about the central line of the wheel and are there brazed together, these rims being pierced for the reception of the spokes as is illustrated in Figs. 1 and 2.

The numeral 30 designates a secondary hub which may be passed through the hub proper of the wheel. This construction is desirable since it provides means for rendering these wheels universal in use. In other words, by this method they may be caused to fit upon any of the various axles now in use. This sub-hub is not an essential feature of the invention for the hub proper of the wheel may be utilized for that purpose if desired.

The construction herein shown and described provides an entirely metallic vehicle wheel which will resist the severe strains incident to traveling at a high rate of speed over rough roads, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a metallic felly, of a plurality of depending tongues projecting inwardly from said felly, a plurality of hollow metallic spokes which engage said tongues, some of said tongues lying upon the outside of the spokes and others of said tongues lying inside of the spokes.

2. In a device of the character described, the combination with a metallic felly, of a plurality of depending tongues projecting inwardly from said felly, a plurality of hollow metallic spokes which engage said tongues, some of said tongues lying upon the outside of the spokes and others of said tongues lying inside of the spokes, and a U-shaped stiffening web carried by the felly from which said tongues depend.

3. In a vehicle wheel, a metallic hub having recesses formed therein adapted to receive the inner ends of the spokes, a plurality of hollow metallic spokes having perforations formed through the walls thereof, projections carried by the walls of said recesses which enter the perforations of the spokes, a felly, and inwardly projecting tongues supported from the felly with which the outer ends of the spokes engage, some of the tongues lying inside of the spokes and some of said tongues lying outside of the spokes.

In testimony whereof I affix my signature in presence of two witnesses.

PETER EBNER.

Witnesses:
FRANK G. CAMPBELL,
A. L. PHELPS.